United States Patent
Wong et al.

(10) Patent No.: US 11,214,999 B2
(45) Date of Patent: Jan. 4, 2022

(54) FRICTION HINGES

(71) Applicant: HEWLETT-PACKARD DEVELOPMENT COMPANY, L.P., Houston, TX (US)

(72) Inventors: Ruey-Jin Wong, Taipei (TW); Eric Chen, Houston, TX (US); Chad Patrick Paris, Houston, TX (US); Marcus Hoggarth, London (GB); Jack Godfreywood, San Francisco, CA (US); Roger Chen, Taipei (TW); Andrew Guscott, Chichester (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 738 days.

(21) Appl. No.: 16/075,613

(22) PCT Filed: Feb. 13, 2017

(86) PCT No.: PCT/US2017/017655
§ 371 (c)(1),
(2) Date: Aug. 4, 2018

(87) PCT Pub. No.: WO2018/147877
PCT Pub. Date: Aug. 16, 2018

(65) Prior Publication Data
US 2021/0207414 A1 Jul. 8, 2021

(51) Int. Cl.
*E05D 11/10* (2006.01)
*E05D 11/08* (2006.01)
*E05D 3/18* (2006.01)

(52) U.S. Cl.
CPC .............. *E05D 11/08* (2013.01); *E05D 3/186* (2013.01); *E05Y 2201/712* (2013.01); *E05Y 2900/606* (2013.01)

(58) Field of Classification Search
CPC .... E05D 3/06; E05D 3/12; E05D 3/14; E05D 3/142; E05D 3/16; E05D 3/125;
(Continued)

(56) References Cited

U.S. PATENT DOCUMENTS 882,721 A * 3/1908 Soss ........................ E05F 3/108
16/68
2,078,815 A * 4/1937 Segar ...................... E05D 3/022
16/286
(Continued)

FOREIGN PATENT DOCUMENTS

CN 1206155 1/1999
CN 105807859 7/2016
(Continued)

*Primary Examiner* — Chuck Y Mah
(74) *Attorney, Agent, or Firm* — Brooks Cameron & Huebsch PLLC

(57) ABSTRACT

In one example, a friction hinge includes a link connected to a slide slot of a first base with a movable shaft and connected to a base friction mechanism of a second base with a link friction mechanism, where the link includes a joint positioned between the movable shaft and the link friction mechanism. In another example, a friction hinge system includes a first link connected to a first slide slot of a first base with a first movable shaft and connected to a first base friction mechanism of a second base with a first link friction mechanism, a second link connected to a second slide slot of the second base with a second movable shaft and connected to a second base friction mechanism of the first base with a second link friction mechanism, and a joint shaft to connect the first link to the second link at a joint.

15 Claims, 3 Drawing Sheets

(58) Field of Classification Search
CPC .......... E05D 3/127; E05D 3/185; E05D 7/04;
E05D 7/0423; E05D 7/0415; E05D 7/043;
E05D 7/0027; E05D 7/0045; E05D 5/02;
E05D 5/062; E05D 2007/0438; E05D
2007/0446; E05D 2007/0453; E05D
2007/0461; E05D 2007/0469; E05D
2007/0476; E05D 2007/0484; E05D
2007/0492; E05Y 2900/132; E05Y
2900/20; E05Y 2900/50; E05Y 2900/531;
E05Y 2900/546; E05Y 2201/638
See application file for complete search history.

(56) References Cited

U.S. PATENT DOCUMENTS

| | | | |
|---|---|---|---|
| 2,320,772 A * | 6/1943 | Doman | E05D 3/183 16/358 |
| 3,881,221 A | 5/1975 | Schmidt | |
| 4,727,622 A | 3/1988 | Tsuneki | |
| 4,979,265 A * | 12/1990 | Grass | E05D 3/022 16/291 |
| 5,012,551 A * | 5/1991 | Beneke | E05F 5/006 16/49 |
| 5,260,043 A * | 11/1993 | Li | B01J 29/061 423/239.2 |
| 6,191,937 B1 * | 2/2001 | Bang | G06F 1/1681 361/679.23 |
| 6,832,412 B2 * | 12/2004 | Kim | E05F 5/00 16/354 |
| 7,127,778 B2 * | 10/2006 | Salice | E05F 5/006 16/354 |
| 7,512,426 B2 | 3/2009 | Maatta et al. | |
| 7,565,720 B1 | 7/2009 | Ligtenberg et al. | |
| 7,765,644 B2 | 8/2010 | Ueyama et al. | |
| 8,064,970 B2 | 11/2011 | Gaddy et al. | |
| 8,186,638 B2 * | 5/2012 | Nishida | B60R 7/10 248/292.12 |
| 8,451,601 B2 | 5/2013 | Bohn et al. | |
| 8,780,570 B2 | 7/2014 | Bohn et al. | |
| 8,982,542 B2 * | 3/2015 | Bohn | G06F 1/1681 361/679.06 |
| 9,725,939 B2 * | 8/2017 | Adair | E05D 11/0081 |
| 10,152,095 B2 * | 12/2018 | Lin | E05D 3/186 |
| 10,316,560 B2 * | 6/2019 | Konrad | E05D 3/186 |
| 10,365,695 B2 * | 7/2019 | Lin | G06F 1/1616 |
| 10,472,870 B2 * | 11/2019 | Tassi | E05F 1/12 |
| 10,597,924 B2 * | 3/2020 | Hu | E05D 3/122 |
| 2008/0289146 A1 | 11/2008 | Chen | |
| 2009/0000062 A1 | 1/2009 | Yamanami | |
| 2011/0041290 A1 * | 2/2011 | Herglotz | E05D 3/18 16/375 |
| 2012/0044620 A1 | 2/2012 | Song et al. | |
| 2012/0090135 A1 * | 4/2012 | Soh | E05F 1/1253 16/250 |
| 2016/0132075 A1 | 5/2016 | Tazbaz | |

FOREIGN PATENT DOCUMENTS

| | | | | |
|---|---|---|---|---|
| CN | 205663745 | 10/2016 | | |
| DE | 10159140 | 12/2000 | | |
| EP | 1857624 | 5/2006 | | |
| EP | 2781676 A1 * | 9/2014 | ......... | E05D 11/1014 |
| JP | 06288139 A * | 10/1994 | ............ | E05D 3/186 |
| JP | 2002121955 | 4/2002 | | |
| WO | WO-2018120490 A1 | 5/2018 | | |

* cited by examiner

FRICTION HINGES

BACKGROUND

Hinges can be coupled to a number of objects. Hinges can allow the number of objects to rotate relative to the number of objects. Hinges can utilize a shaft that the number of objects can rotate around. In some examples, the shaft can allow the number of objects to freely rotate around the shaft. In some examples, hinges can be utilized in electronic devices such as laptop computers to allow the screen portion and a base portion to rotate from an open position to a closed position.

DETAILED DESCRIPTION

Figure 1:
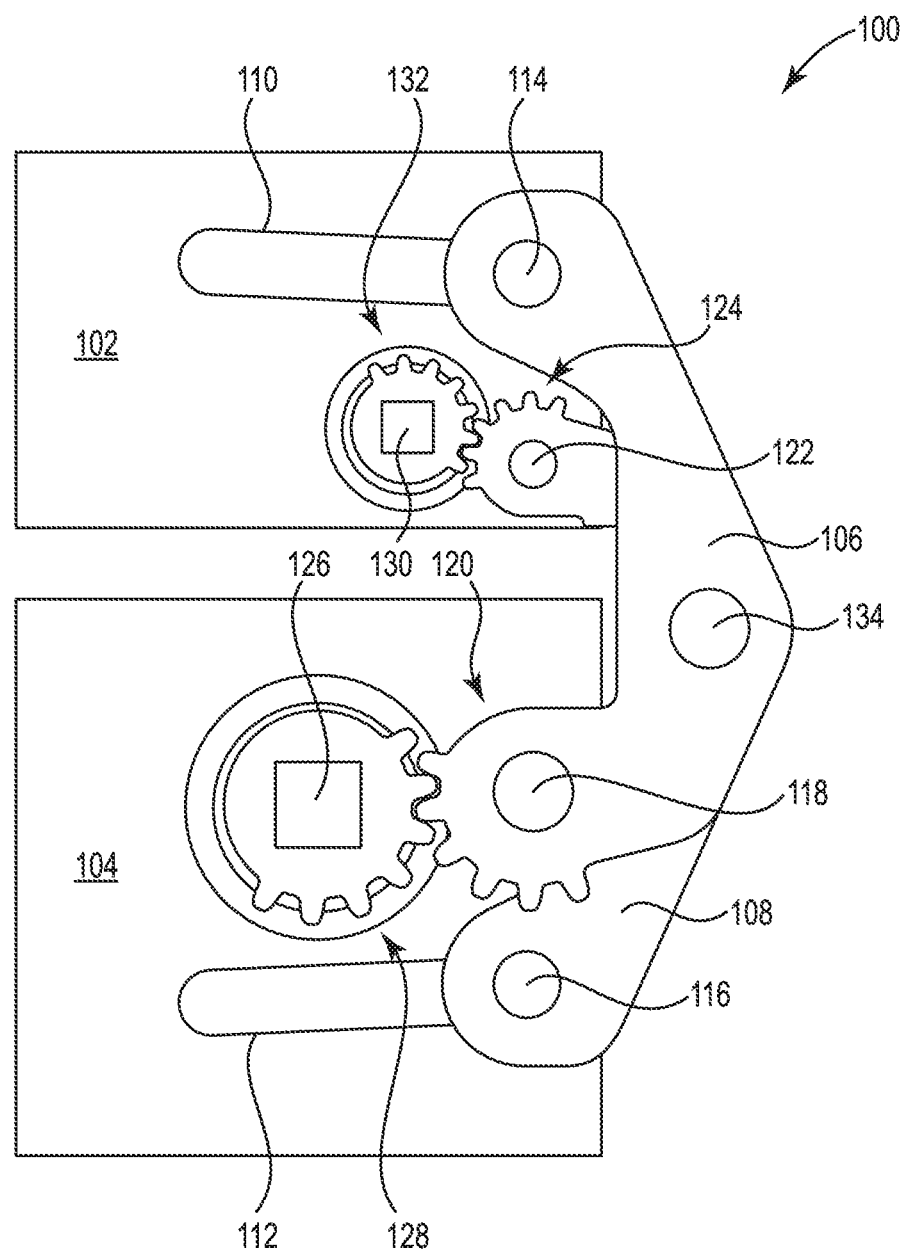
FIG. 1 illustrates an example friction hinge consistent with the present disclosure.

A number of systems and devices for a friction hinge are described herein. In some examples, a friction hinge includes a link connected to a slide slot of a first base with a movable shaft and connected to a base friction mechanism of a second base with a link friction mechanism, wherein the link includes a joint positioned between the movable shaft and the link friction mechanism. In another example, a friction hinge system includes a first link connected to a first slide slot of a first base with a first movable shaft and connected to a first base friction mechanism of a second base with a first link friction mechanism, a second link connected to a second slide slot of the second base with a second movable shaft and connected to a second base friction mechanism of the first base with a second link friction mechanism, and a joint shaft to connect the first link to the second link at a joint.

In some examples, the friction hinge can be utilized as a concealed hinge. As used herein, a concealed hinge is a hinge that includes components (e.g., shafts, links, friction mechanisms, etc.) that are concealed or hidden at least when the hinge is in a particular position. In some examples, the friction hinge can be utilized for a laptop computer or other type of electronic device. In some examples, the friction hinge can be coupled to a number of bases. As used herein, a base can be a physical structure. In some examples, when the friction hinge is utilized for an electronic device, the base can be a keyboard, a display, and/or other type of electronic device. For example, the hinge can be connected to a first base that is a keyboard of a laptop computer and the second base can be a display of the laptop computer. In other examples, the first base can be a first touchscreen display and the second base can be a second touchscreen display.

In some examples, the friction hinge can include a number of links that are coupled together at a joint of the friction hinge. Each of the number of links can be coupled to a first base and a second base. For example a first end of a first link can be coupled to the first base via a slot connection and a second end of the first link can be coupled to a restriction mechanism of the second base. In this example, a first end of a second link can be coupled to the second base via a slot connection and a second end of the second link can be coupled to a restriction mechanism of the first base. In this example, each of the first and second link can position the first base and the second base in an open position that includes a relatively smaller gap between the first base and the second base compared to previous hinges.

Reducing the distance of a gap between the first base and the second can provide an electronic device utilizing the friction hinge with relatively less interference between the first base and the second base. In some examples, the first base and the second base can each be a display and having a relatively smaller gap can reduce the interference between the first display and the second display when the first display and second display are utilized together. In some examples, the friction hinge can enable the first base and the second base to be capable of a free stop at a plurality of angles between 0 degrees to 360 degrees. The free stop capability can allow a user to position the first base and the second base at a plurality of different positions, including a position where the first base is substantially parallel with the second base due to the reduced distance of the gap.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIG. 1 illustrates an example friction hinge 100 consistent with the present disclosure. The friction hinge 100 can be utilized to connect a number of bases together. For example, the friction hinge 100 can be utilized to connect a first base 102 to a second base 104. As described herein, the friction hinge 100 can be utilized for computing devices such as laptop computer and/or multiple display devices. For example, the friction hinge 100 can be utilized to connect a first base 102 that is a display for a laptop computer to a second base 104 that is a keyboard for a laptop computer. The friction hinge 100 can be utilized in a plurality of configurations where a concealed hinge with a relatively smaller distance gap exists when the first base 102 and second base 104 are aligned in an open position.

In some examples, the friction hinge 100 can include a plurality of individual links (e.g., links that are independent links, etc.). For example, the friction hinge 100 can include a first link 106 and a second link 108. In some examples, the first link 106 can be an independent link from the second link 108 while being connected at a joint 134. That is, the first link 106 may not be connected to the second link 108 other than at the joint 134. In some examples, the first link 106 can be connected to the second link 108 by a shaft positioned through the first link 106 and the second link 108 at the joint 134. In some examples, the first link 106 and the second link 108 can be rotated in a clockwise and/or counterclockwise direction at the joint 134 to allow the first base 102 and the second base 104 to be rotated around the joint 134.

In some examples, the first link 106 and the second link 108 can each include different lengths from the joint 134 to a connection at the first base and from the joint 134 to a connection at the second base. For example, the first link 106 can include a first distance 105 between the joint 134 and a movable shaft 114 connected to a slot 110 of the first base 102. In this example, the first link 106 can include can include a second distance 107 between the joint 134 and a shaft 118 connected to a link friction mechanism 120 that can interact with a base friction mechanism 128 (e.g., base gear, second base gear, etc.) and/or friction shaft 126 (e.g., base shaft, second base shaft, etc.). In some examples, the base friction mechanism 128 can include a base gear that is connected to the friction shaft 126 that provides friction when the friction shaft 126 is rotated. In some examples, the first distance 105 can be a longer distance than the second distance 107. In some examples, the second link 108 can include similar features as the first link 106.

In some examples, a first end of the first link 106 can be connected to the first base 102 with a movable shaft 114 positioned within a slot 110. In some examples, the movable shaft 114 can move freely from a first end of the slot 110 to a second end of the slot 110. For example, as illustrated in FIG. 1, the movable shaft 114 can move from a right end of the slot 110 to a left end of the slot 110. In this example, moving the movable shaft 114 from a first end of the slot 110 toward a second end of the slot 110 can allow the first base 102 to move from a first position toward a second position.

In some examples, a second end of the first link 106 can be connected to the second base 104 by a shaft 118 (e.g., link shaft, etc.) coupled to a link friction mechanism 120. In some examples, the link friction mechanism 120 can be a gear (e.g., link gear, etc.) with a plurality of cogs. In some examples, the link friction mechanism 120 can be fixed to the first link 106 such that a clockwise or counterclockwise movement on the shaft 118 results in movement of the first link 106 with a pivot at the joint 134. In addition, a clockwise or counterclockwise movement on the shaft 118 can result in movement of the movable shaft 114 within the slot 110 of the first base 102.

In some examples, a plurality of cogs of the link friction mechanism 120 can interact with a corresponding plurality of cogs of a base friction mechanism 128 that is connected to a friction shaft 126 (e.g., base shaft, etc.). In some examples, the base friction mechanism 128 and the friction shaft 126 can be a single unit and is illustrated as such for explanation. That is, a base friction mechanism as described herein can include a gear portion (e.g., base friction mechanism 128) and a shaft portion (e.g., friction shaft 126).

In some examples, the friction shaft 126 can provide resistance and/or friction when the friction shaft 126 is rotated either clockwise or counterclockwise. For example, the first link 106 can be moved such that the link friction mechanism 120 rotates the base friction mechanism 128 and/or friction shaft 126. In this example, the base friction mechanism 128 and/or friction shaft 126 can provide resistance as the first base 102 is moved away from the second base 104 around the joint 134. In some examples, the base friction mechanism 128 and/or friction shaft 126 can provide enough friction to enable the first base 102 and the second base 104 to free stop at a plurality of angles (e.g., between 0 degrees and 360 degrees) without a locking mechanism while allowing the first base 102 and the second base 104 to move positions.

In some examples, the first link 106 can be utilized with a second link 108. In some examples, the first link 106 and the second link 108 can be inverses. For example, the movable shaft 114 of the first link 106 can be connected to the first base 102 and a movable shaft 116 of the second link 108 can be connected to the second base 104. Similarly, the shaft 118 connected to the link friction mechanism 120 of the first link 106 can be connected to the second base 104 and a shaft 122 (e.g., link shaft, second link shaft, etc.) connected to a link friction mechanism 124 of the second link 108 can be connected to the first base 102. In this way, the first link 106 and the second link 108 can provide opposing forces as the first base 102 and/or the second base 104 move around the joint 134.

In some examples, the second link 108 can include a shaft 122 that can be connected to the link friction mechanism 124. In some examples, the link friction mechanism 124 can be a gear that includes a plurality of cogs that can interact with a corresponding plurality of cogs of a base friction mechanism 132 connected to a friction shaft 130 (e.g., base shaft, first base shaft, etc.). The plurality of cogs of the link friction mechanism 124 can rotate the friction shaft 130 by interacting with a plurality of corresponding cogs of the base friction mechanism 132. In some examples, the friction shaft 130 and/or the base friction mechanism 132 can provide friction and/or resistance as the second link 108 moves from a first position to a second position as described herein.

In some examples, a size of the base friction mechanism 128 of the second base 104 can be different than the base friction mechanism 132 of the first base 102. For example, a diameter of the base friction mechanism 128 of the second base 104 can be different than the base friction mechanism 132 of the first base 102. In this example, the diameter of the base friction mechanism 128 of the second base 104 can be larger than the diameter of the base friction mechanism 132 of the first base 102. In some examples, the diameter of a base friction mechanism can change a level of resistance and/or friction applied on the corresponding link as the first base 102 and/or second base 104 is rotated around the joint 134. For example, a larger diameter of the base friction mechanism can result in a relatively lower resistance compared to a smaller diameter of a base friction mechanism even when the same level of friction or resistance is applied by a friction shaft.

In some examples, the friction shaft 126 of the second base 104 can provide a different level of resistance and/or friction compared to the friction shaft 130 of the first base 102. For example, the friction shaft 126 of the second base 104 can provide a greater level of resistance and/or friction than the friction shaft 130 of the first base 102. In some examples, the level of friction provided by the friction shaft 126 and/or the friction shaft 130 can be based on a weight of the first base 102 and/or the second base 104.

In some examples, the friction hinge 100 illustrated in FIG. 1 can be in a closed position. For example, a surface 136 of the second base 104 can be a keyboard or other type of input device for a laptop computer and surface 138 of the first base 102 can be a display or touchscreen display of the laptop computer. In some examples, the closed position of the friction hinge 100 can be utilized to protect surface 136 of the second base 104 and/or protect surface 138 of the first base 102.

The friction hinge 100 can provide a free stop for a plurality of positions of the first base 102 and the second base 104. As described herein, the free stop can include an ability to lock the first base 102 and the second base 104 into a particular angle without engaging a locking mechanism and allowing the first base 102 and the second base 104 to change positions without disengaging a locking mechanism. The friction hinge 100 can reduce a gap between the first base 102 and the second base 104 at a plurality of different positions.

Figure 2:
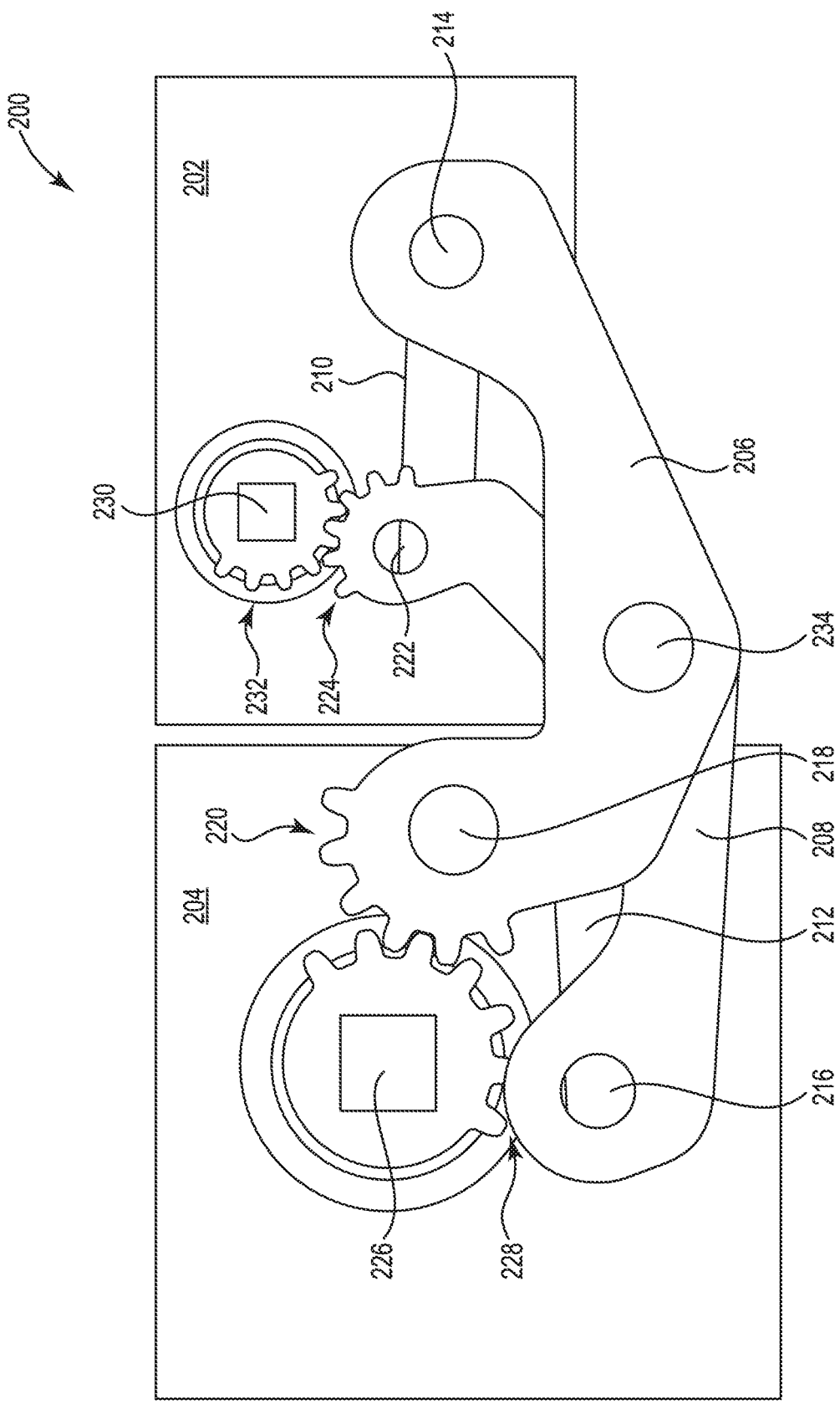
FIG. 2 illustrates an example friction hinge consistent with the present disclosure.

FIG. 2 illustrates an example friction hinge 200 consistent with the present disclosure. In some examples, the friction hinge 200 can include the same or similar elements as friction hinge 100 as referenced in FIG. 1. In some examples, the friction hinge 200 can be utilized as a concealed hinge for a computing device such as a laptop computer and/or a multiple display tablet device. In some examples, the friction hinge 200 can provide a reduced gap between a first base and a second base when the first base is rotated from a closed position to an open position. The reduced gap can reduce a thickness of the device (e.g., added distance of the first base, the second base, and the gap) can provide relatively thinner devices in a closed and open position.

In some examples, the friction hinge 200 as illustrated in FIG. 2 can be in an open position. For example, friction hinge 100 as referenced in FIG. 1 can be in a closed position where surfaces 136, 138 are positioned surface to surface and friction hinge 200 can be in an open position where surface 236 is positioned on a first side of a device and surface 238 is positioned on a second side of the device. In this example, the surface 236 can be a keyboard or display that is exposed on the first side of the device and the surface 238 can be a keyboard or display that is exposed on the second side of the device.

In some examples, the friction hinge 200 can include a plurality of individual links (e.g., links that are independent links, etc.). For example, the friction hinge 200 can include a first link 206 and a second link 208. In some examples, the first link 206 can be an independent link from the second link 208 while being connected at a joint 234. In some examples, the first link 206 and the second link 208 can be rotated in a clockwise and/or counterclockwise direction at the joint 234 to allow the first base 202 and the second base 204 to be rotated around the joint 234.

In some examples, a first end of the first link 206 can be connected to the first base 202 with a movable shaft 214 positioned within a slot 210. In some examples, the movable shaft 214 can move freely from a first end of the slot 210 to a second end of the slot 210. For example, as illustrated in FIG. 2, the movable shaft 214 can move from a right end of the slot 210 to a left end of the slot 210. In this example, moving the movable shaft 214 from a first end of the slot 210 toward a second end of the slot 210 can allow the first base 202 to move from a first position toward a second position. As illustrated in FIG. 2, the shaft 214 is moved to a second position when compared to the position of shaft 114 as illustrated in FIG. 1.

In some examples, a second end of the first link 206 can be connected to the second base 204 by a shaft 218 coupled to a link friction mechanism 220. In some examples, the link friction mechanism 220 can be gear with a plurality of cogs. In some examples, the link friction mechanism 220 can be fixed to the first link 206 such that a clockwise or counterclockwise movement on the shaft 218 results in movement of the first link 206 with a pivot at the joint 234. In addition, a clockwise or counterclockwise movement on the shaft 218 can result in movement of the movable shaft 214 within the slot 210 of the first base 202.

In some examples, a plurality of cogs of the link friction mechanism 220 can interact with a corresponding plurality of cogs of a base friction mechanism 228 that is connected to a friction shaft 226. In some examples, the base friction mechanism 228 and the friction shaft 226 can be a single unit and is illustrated as such for explanation. That is, a base friction mechanism as described herein can include a gear portion (e.g., base friction mechanism 228) and a shaft portion (e.g., friction shaft 226).

As described herein, the friction shaft 226 can provide resistance and/or friction when the friction shaft 226 is rotated either clockwise or counterclockwise. For example, the first link 206 can be moved such that the link friction mechanism 220 rotates the base friction mechanism 228 and/or friction shaft 226. In this example, the base friction mechanism 228 and/or friction shaft 226 can provide resistance as the first base 202 is moved away from the second base 204 around the joint 234. In some examples, the base friction mechanism 228 and/or friction shaft 226 can provide enough friction to enable the first base 202 and the second base 204 to free stop at a plurality of angles (e.g., between 0 degrees and 360 degrees) without a locking mechanism while allowing the first base 202 and the second base 204 to move positions.

As described herein, the first link 206 can be utilized with a second link 208. In some examples, the first link 206 and the second link 208 can be inverses. For example, the movable shaft 214 of the first link 206 can be connected to the first base 202 and a movable shaft 216 of the second link 208 can be connected to the second base 204. Similarly, the shaft 218 connected to the link friction mechanism 220 of the first link 206 can be connected to the second base 204 and a shaft 222 connected to a link friction mechanism 224 of the second link 208 can be connected to the first base 202. In this way, the first link 206 and the second link 208 can provide opposing forces as the first base 202 and/or the second base 204 move around the joint 234.

As described herein, the second link 208 can include a shaft 222 that can be connected to the link friction mechanism 224. In some examples, the link friction mechanism 224 can be a gear that includes a plurality of cogs that can interact with a corresponding plurality of cogs of a base friction mechanism 232 connected to a friction shaft 230. The plurality of cogs of the link friction mechanism 224 can rotate the friction shaft 230 by interacting with a plurality of corresponding cogs of the base friction mechanism 232. In some examples, the friction shaft 230 and/or the base friction mechanism 232 can provide friction and/or resistance as the second link 208 moves from a first position to a second position as described herein.

In some examples, the friction hinge 200 illustrated in FIG. 2 can be in an open position. For example, a surface 236 of the second base 204 can be a keyboard or other type of input device for a laptop computer and surface 238 of the first base 202 can be a display or touchscreen display of the laptop computer. In some examples, the open position of the friction hinge 200 can be utilized to the surface 238 and/or the surface 236. For example, the open position as illustrated in FIG. 2 can be utilized for converting a device from a position for utilization as a laptop to a position for utilization as a tablet. Thus, reduction of a gap 209 can make the open position for utilization as a tablet relatively slimmer compared to previous hinges that have a relatively larger gap 209.

The friction hinge 200 can provide a free stop for a plurality of positions of the first base 202 and the second base 204. As described herein, the free stop can include an ability to lock the first base 202 and the second base 204 into a particular angle without engaging a locking mechanism and allowing the first base 202 and the second base 204 to change positions without disengaging a locking mechanism. The friction hinge 200 can reduce the gap 209 between the first base 202 and the second base 204 at a plurality of different positions.

Figure 3:
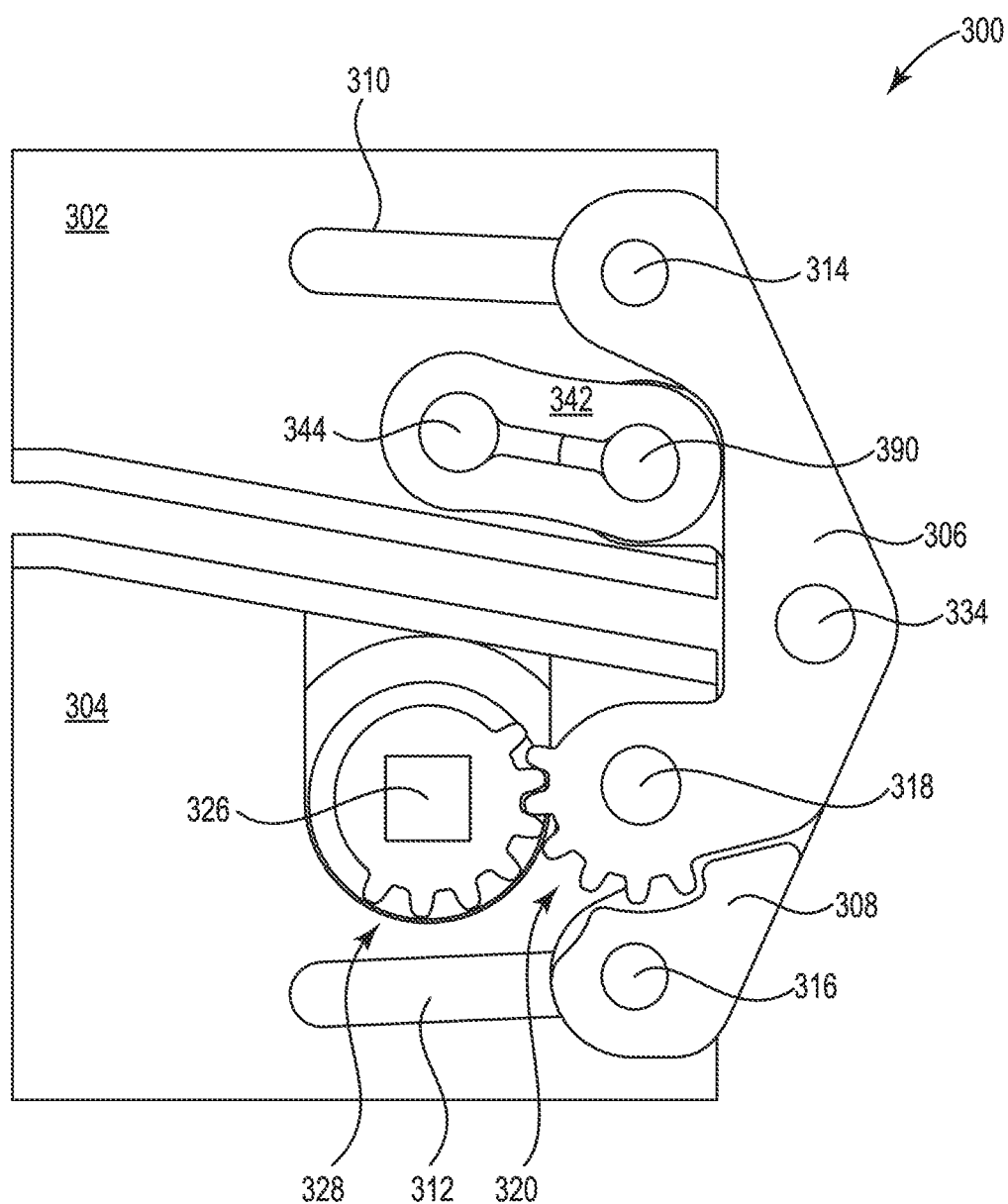
FIG. 3 illustrates an example friction hinge consistent with the present disclosure.

FIG. 3 illustrates an example friction hinge 300 consistent with the present disclosure. In some examples, the friction hinge 300 can include the same or similar elements as friction hinge 100 as referenced in FIG. 1 and/or the same or similar elements as friction hinge 200 as referenced in FIG. 2.

In some examples, the friction hinge 300 can be utilized as a concealed hinge for a computing device such as a laptop computer and/or a multiple display tablet device. In some examples, the friction hinge 300 can provide a reduced gap between a first base 302 and a second base 304 when the first base 302 is rotated from a closed position to an open position. The reduced gap can reduce a thickness of the device (e.g., added distance of the first base 302, the second base 304, and the gap) can provide relatively thinner devices in a closed and open position.

In some examples, the friction hinge 300 as illustrated in FIG. 3 can be in a closed position. For example, friction hinge 300 can be in a closed position where surfaces 136, 138 are positioned surface to surface to protect the surface 336 of the second base 304 and/or the surface 338 of the first base 302.

In some examples, the friction hinge 300 can include a plurality of individual links (e.g., links that are independent links, etc.). For example, the friction hinge 300 can include a first link 306 and a second link 308. In some examples, the first link 306 can be an independent link from the second link 308 while being connected at a joint 334. In some examples, the first link 306 and the second link 308 can be rotated in a clockwise and/or counterclockwise direction at the joint 334 to allow the first base 302 and the second base 304 to be rotated around the joint 334.

As described herein, a first end of the first link 306 can be connected to the first base 302 with a movable shaft 314 positioned within a slot 310. In some examples, the movable shaft 314 can move freely from a first end of the slot 310 to a second end of the slot 310. For example, as illustrated in FIG. 3, the movable shaft 314 can move from a right end of the slot 310 to a left end of the slot 310. In this example, moving the movable shaft 314 from a first end of the slot 310 toward a second end of the slot 310 can allow the first base 302 to move from a first position toward a second position.

In some examples, a second end of the first link 306 can be connected to the second base 304 by a shaft 318 coupled to a link friction mechanism 320. In some examples, the link friction mechanism 320 can be gear with a plurality of cogs. In some examples, the link friction mechanism 320 can be fixed to the first link 306 such that a clockwise or counterclockwise movement on the shaft 318 results in movement of the first link 306 with a pivot at the joint 334. In addition, a clockwise or counterclockwise movement on the shaft 318 can result in movement of the movable shaft 314 within the slot 310 of the first base 302.

In some examples, a plurality of cogs of the link friction mechanism 320 can interact with a corresponding plurality of cogs of a base friction mechanism 328 that is connected to a friction shaft 326. In some examples, the base friction mechanism 328 and the friction shaft 326 can be a single unit and is illustrated as such for explanation. That is, a base friction mechanism as described herein can include a gear portion (e.g., base friction mechanism 328) and a shaft portion (e.g., friction shaft 326).

As described herein, the friction shaft 326 can provide resistance and/or friction when the friction shaft 326 is rotated either clockwise or counterclockwise. For example, the first link 306 can be moved such that the link friction mechanism 320 rotates the base friction mechanism 328 and/or friction shaft 326. In this example, the base friction mechanism 328 and/or friction shaft 326 can provide resistance as the first base 302 is moved away from the second base 304 around the joint 334. In some examples, the base friction mechanism 328 and/or friction shaft 326 can provide enough friction to enable the first base 302 and the second base 304 to free stop at a plurality of angles (e.g., between 0 degrees and 360 degrees) without a locking mechanism while allowing the first base 302 and the second base 304 to move positions.

As described herein, the first link 306 can be utilized with a second link 308. In some examples, the first link 306 and the second link 308 can be inverses. For example, the movable shaft 314 of the first link 306 can be connected to the first base 302 and a movable shaft 316 of the second link 308 can be connected to the second base 304. Similarly, the shaft 318 connected to the link friction mechanism 320 of the first link 306 can be connected to the second base 304 and a shaft 340 connected to a base friction mechanism 342 of the second link 308 can be connected to the first base 302. In this way, the first link 306 and the second link 308 can provide opposing forces as the first base 302 and/or the second base 304 move around the joint 334.

In some examples, the shaft 340 connected to the base friction mechanism 342 can be utilized to provide resistance and/or friction to the second link 308 when the movable shaft 316 is moved from a first position to a second position within the slot 312. In some examples, the base friction mechanism 342 can be a spring coil friction mechanism. In some examples, the sprint core friction mechanism can be an elastic material that is connected to the shaft 340 connected to the second link 308 and connected to the shaft 344 connected to the first base 302. Thus, in some examples, the base friction mechanism can provide a particular level of resistance based on the elasticity of the elastic material of the base friction mechanism 342. In some examples, the elastic material can be determined based on a weight or size of the first base and/or second base. In addition, the elastic material can be determined based on a level of resistance to be provided to the friction hinge 300 when the first base 302 and/or second base 304 are rotated around the joint 334.

In some examples, the friction hinge 300 illustrated in FIG. 3 can be in a closed position. For example, a surface 336 of the second base 304 can be a keyboard or other type of input device for a laptop computer and surface 338 of the first base 302 can be a display or touchscreen display of the laptop computer. In some examples, the closed position of the friction hinge 300 can be utilized to protect the surface 338 and/or the surface 336 such that the surfaces 336, 338 are face to face and not exposed to an exterior environment.

The friction hinge 300 can provide a free stop for a plurality of positions of the first base 302 and the second base 304. As described herein, the free stop can include an ability to lock the first base 302 and the second base 304 into a particular angle without engaging a locking mechanism and allowing the first base 302 and the second base 304 to change positions without disengaging a locking mechanism. That is, the resistance provided by the number of friction mechanisms can allow the first base 302 and the second base 304 to stop and stay in a particular position instead of freely moving without an ability to stop in particular positions.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

What is claimed:

1. A friction hinge connecting a first base to a second base, comprising:

a first link connected to a first slide slot of the first base with a first movable shaft and meshed with a first base friction mechanism on the second base by a first link friction mechanism, wherein the first base friction mechanism includes a first cylindrical diameter;

a second link connected to a second slide slot of the second base with a second movable shaft and meshed with a second base friction mechanism on the first base with a second link friction mechanism, wherein the second base friction mechanism includes a second cylindrical diameter; and a joint shaft to connect the first link to the second link at a joint.

2. The friction hinge of claim 1, wherein the base friction mechanisms include base friction shafts coupled to base gears that provide friction when the base friction shaft is rotated.

3. The friction hinge of claim 2, wherein the link friction mechanisms include link shafts coupled to link gears that interact with the base gears to rotate the base friction shaft connected to each base gear.

4. The friction hinge of claim 1, wherein each base friction mechanism includes a base shaft coupled to a first side of a spring coil and the link friction mechanism includes a link shaft coupled to a second side of the sprint core.

5. The friction hinge of claim 1, wherein the first base includes a base friction mechanism for a different link connected to the link by the joint.

6. A system for a friction hinge connecting a first base to a second base, comprising:

a first link connected to a first slide slot of the first base with a first movable shaft and meshed with a first base friction mechanism on the second base by a first link friction mechanism, wherein the first base friction mechanism includes a first cylindrical diameter and first level of resistance;

a second link connected to a second slide slot of the second base with a second movable shaft and meshed with a second base friction mechanism on the first base with a second link friction mechanism, wherein the second base friction mechanism includes a second cylindrical diameter and second resistance level; and a joint shaft to connect the first link to the second link at a joint.

7. The system of claim 6, wherein the second base friction mechanism provides greater friction compared to the first base friction mechanism.

8. The system of claim 6, wherein the first link and the second link overlap at the joint.

9. The system of claim 6, wherein the first base and the second base rotate from a first position to a second position via the joint.

10. The system of claim 6, wherein the first link friction mechanism includes a link shaft connected to a link gear that interacts with a base gear connected to a base shaft that provides friction when the base shaft is rotated.

11. The system of claim 6, wherein the first base and the second base free stop at a plurality of angles between 0 degrees and 360 degrees.

12. A friction hinge connecting a first base to a second base, comprising:

a first link connected to a first slide slot of the first base with a first movable shaft and meshed with a first base friction mechanism of a second base with a first link friction mechanism, wherein the first base friction mechanism includes a first cylindrical diameter with a first level of resistance;

a second link connected to a second slide slot of the second base with a second movable shaft and meshed with a second base friction mechanism of the first base with a second link friction mechanism, wherein the second base friction mechanism includes a second cylindrical diameter with a second level of resistance, wherein the second cylindrical diameter is greater than the first cylindrical diameter and the second level of resistance is higher than the first level of resistance; and a joint shaft to connect the first link to the second link at a joint, wherein the combination of different resistance levels allows the device to free stop at a plurality of positions from 0 to 360 degrees, wherein the distance between the joint shaft and the slide slot is asymmetrical to the distance between the joint shaft and the link friction mechanism for each link.

13. The friction hinge of claim 12, wherein the second movable shaft moves along the second slide slot when the first base is rotated at the joint from the second base.

14. The friction hinge of claim 12, wherein the first movable shaft moves along the first slide slot when the first base is rotated at the joint from the second base.

15. The friction hinge of claim 12, wherein the first link and the second link are separate links that are connected by the joint shaft at the joint.

* * * * *